US006551407B2

(12) United States Patent
Drzal et al.

(10) Patent No.: US 6,551,407 B2
(45) Date of Patent: Apr. 22, 2003

(54) METHOD FOR TREATMENT OF SURFACES TO REMOVE MOLD RELEASE AGENTS WITH CONTINUOUS ULTRAVIOLET CLEANING LIGHT

(75) Inventors: Lawrence T. Drzal, Okemos, MI (US); Michael J. Rich, Williamston, MI (US); Laura M. Fisher, Dearborn, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 97 days.

(21) Appl. No.: 09/761,089

(22) Filed: Jan. 15, 2001

(65) Prior Publication Data

US 2002/0129832 A1 Sep. 19, 2002

(51) Int. Cl.[7] ............................ B08B 7/00; B29C 35/08
(52) U.S. Cl. ............................ 134/1; 264/400; 264/139
(58) Field of Search ................ 134/1, 2, 40; 219/121.6, 219/121.68, 121.69, 121.85; 264/139, 400

(56) References Cited

U.S. PATENT DOCUMENTS 3,890,176 A 6/1975 Bolon ........................... 156/2
4,717,516 A 1/1988 Isaka et al. ................... 264/22
4,756,765 A 7/1988 Woodroffe ..................... 134/1
4,803,021 A 2/1989 Werth et al. .................. 264/25
4,810,434 A 3/1989 Caines ........................ 264/22
4,867,796 A 9/1989 Asmus et al. .................. 134/1
5,019,210 A 5/1991 Chou et al. ................. 156/643
5,098,618 A 3/1992 Zelez .......................... 264/22
5,281,798 A 1/1994 Hamm et al. ............... 250/205
5,357,005 A 10/1994 Buchwalter et al. ........ 525/436
5,500,459 A 3/1996 Hagemayer et al. ........ 523/300
5,512,123 A 4/1996 Cates et al. .............. 156/272.6
5,637,245 A * 6/1997 Shelton et al. ......... 219/121.69

FOREIGN PATENT DOCUMENTS

GB 723631 2/1955

OTHER PUBLICATIONS

Bolon et al., Polymer Engineering and Science, vol. 12,pp 109–111 (1972).

Walzak et al.,Poly. Surface Mod.: Relevance to Adhesion, K.L. Mittal (Editor) 253–272 (1995).

Strobel et al., Journal of Adhesion Sci & Tech. pp 365–383 (1995).

N. Dontula et al., Proc. of 20th Ann Adhesion Soc. Meeting, Hilton Head, SC (1997).

C.L. Weitzsacker et al., Utilizing X–ray photo–electron Spect. to investigate modified polymer surfaces: Proc. of 20th Ann Adhesion Soc. Meeting Hilton Head, SC (1997).

Dontula et al., "Surface activation of Polymers using ultraviolet activation" Proc. of Soc. of Plastics Eng. ANTEC (1997),Toronto, Canada.

Haack, L.P., et al., 22nd Adhesion Soc. Meeting (Feb. 22–24, 1999).

"Experimental Methods in Photochemistry", Chapter7 pp. 686–705 (1982).

* cited by examiner

*Primary Examiner*—Randy Gulakowski
*Assistant Examiner*—Joseph L. Perrin
(74) *Attorney, Agent, or Firm*—Ian C. McLeod

(57) ABSTRACT

A method using irradiation of surfaces 12A of substrates (12) with ultra violet light to remove a parting agent is described. The light can be pulsed or continuous. The treated surfaces are more paintable and bondable. The treated molds prevent the introduction of surface inhomogeneities caused by the parting agent.

14 Claims, 11 Drawing Sheets

As Received

After UV Treatment

UV/Ozone Generating Mechanism

UV spectrum $$O_2 + uv\ (185\ nm) \longrightarrow O + O$$

$$O + O_2 \longrightarrow O_3$$

$$O_3 + uv\ (254\ nm) \longrightarrow O_2 + O$$

METHOD FOR TREATMENT OF SURFACES TO REMOVE MOLD RELEASE AGENTS WITH CONTINUOUS ULTRAVIOLET CLEANING LIGHT

CROSS-REFERENCES TO RELATED APPLICATIONS

None

STATEMENT REGARDING FEDERALLY SPONSORED RESEARCH OR DEVELOPMENT

None

BACKGROUND OF THE INVENTION (1) Field of the Invention

The present invention relates to a method for treating surfaces of substrates of molds or molded parts to remove mold release agents using continuous ultraviolet light. Ozone can be used to treat the surface in addition to the ultraviolet light. The treatment enhances surface activation, allows for surface cleaning in short time periods and increases the wetting characteristics of the surface.

(2) Description of Related Art

Surfaces of articles of manufacture which are molded or are a mold always contain undesirable compounds or additives that are used to prevent binding to the mold surface and which particularly reduce adhesion to a paint or film to the surface. Hence, surface preparation, which includes cleaning of the surfaces, of polymeric, polymer composite or metal substrates, to remove the mold release agent is carried out prior to applying protective paint films or adhesive bonding or re-use of the mold. Surface preparation determines the mechanical and durability characteristics of the layered composite created. Currently the techniques used for surface preparation are mechanical surface treatments (e.g. abrasion) solvent wash and chemical modification techniques like corona, laser plasma, flame treatment and acid etching. Each of the existing processes have shortcomings and thus, they are of limited use. Abrasion techniques are found to be time consuming, labor intensive and have the potential to damage the adherent surface. Use of organic solvents results in volatile organic chemical (VOC) emissions. Chemical techniques are costly and are of limited use with regard to treating three dimensional parts. Other methods are usually batch processes (such as plasma, acid etching) and need tight control.

Commercial washing requires multiple stages (9 to 12), chemicals and for cleaning. High pressure washers are used at each stage which consumes a lot of water which then must be purified. The economics of washing is relatively very poor.

The focused beams of lasers make it difficult to treat a large surface. U.S. Pat. No. 4,803,021 to Werth et al describes such a method. U.S. Pat. No. 4,756,765 to Woodroffe describes paint removal with surface treatment using a laser.

Plasma treatment of surfaces requires relatively expensive equipment and the plasmas are difficult to control. The surfaces are treated with any gas, e.g. vaporized water, in the plasma. Illustrative of this art are U.S. Pat. Nos. 4,717,516 to Isaka et al., 5,019,210 to Chou et al., and 5,357,005 to Buchwalter et al.

A light based process which cleans a substrate surface also creates a beneficial chemistry on the surface for adhesive bonding and paintability is described in U.S. Pat. No. 5,512,123 to Cates et al. The process involves exposing the desired substrate surface to be treated to flashlamp radiation having a wavelength of 160 to 5000 nanometers. Ozone is used with the light to increase the wetability of the surface of the substrate being treated. Surfaces of substrates such as metals, polymers, polymer composites are cleaned by exposure to the flashlamp radiation. The problem with the Cates et al process is that the surface of the substrate is heated to a relatively high temperature, particularly by radiation above 500 nanometers and requires relatively long treatment times. Related patents to Cates et al are U.S. Pat. Nos. 3,890,176 to Bolon; 4,810,434 to Caines; 4,867,796 to Asmus et al; 5,281,798 to Hamm et al and 5,500,459 to Hagemeyer et al and U.K. Patent No. 723,631 to British Cellophane. Non-patent references are: Bolon et al., "Ultraviolet Depolymerization of Photoresist Polymers", Polymer Engineering and Science, Vol. 12 pages 109–111 (1972). M. J. Walzak et al., "UV and Ozone Treatment of Polypropylene and poly (ethylene terephthalate)", In: Polymer Surface Modification: Relevance to Adhesion, K. L. Mittal (Editor), 253–272 (1995); M. Strobel et al., "A Comparison of gas-phase methods of modifying polymer surfaces", Journal of Adhesion Science and Technology, 365–383 (1995); N. Dontula et al., "A study of polymer surface modification using ultraviolet radiation", Proceedings of 20th Annual Adhesion Society Meeting, Hilton Head, S.C. (1997); C. L. Weitzsacker et al., "Utilizing X-ray photoelectron spectroscopy to investigate modified polymer surfaces", Proceedings of 20th Annual Adhesion Society Meeting, Hilton Head, S.C. (1997); N. Dontula et al., "Ultraviolet light as an adhesive bonding surface pretreatment for polymers and polymer composites", Proceedings of ACCE'97, Detroit, Mich.; C. L. Weitzsacker et al., "Surface pretreatment of plastics and polymer composites using ultraviolet light", Proceedings of ACT'97, Detroit, Mich.; N. Dontula et al., "Surface activation of polymers using ultraviolet activation", Proceedings of Society of Plastics Engineers ANTEC'97, Toronto, Canada. Haack, L. P., et al., 22nd Adhesion Soc. Meeting (Feb. 22–24, 1999).

Non-pulsed UV lamps have been used by the prior art. These are described in: "Experimental Methods in Photochemistry", Chapter 7, pages 686–705 (1982). U.S. Pat. No. 5,098,618 to Zelez is illustrative of the use of these types of lamps with a low wattage input.

There is a need for development of an environmentally friendly, as well as cost effective and robust surface treatment process for removing mold release agents from surfaces.

OBJECTS

It is therefore an object of the present invention to provide a process which is reliable and which cleans surfaces of mold release agents. It is further an object of the present invention to provide a process which is rapid and economical. These and other objects will become increasingly apparent by reference to the following description and the drawings.

SUMMARY OF THE INVENTION

The present invention relates to

A method for removing mold release agents from a surface which comprises:

exposing the surface coated with the mold release agent to continuous ultraviolet light to thereby volatilize the mold parting agent without damaging the surface.

The wattage input to the light is between about 0.1 and 20 kW to provide continuous light.

The phrase "mold release agent" means a thin film of any material which acts to enable a molded item to be removed from a mold. This includes lubricants and soaps used for this purpose. The agents are on the mold and on the molded product.

The phrase "molded part" includes casting, injection molding, compression molding, stamping and other methods of mechanical forming.

The substance and advantages of the present invention will become increasingly apparent by reference to the following drawings and the description.

DESCRIPTION OF THE PREFERRED EMBODIMENTS

Figure 1:
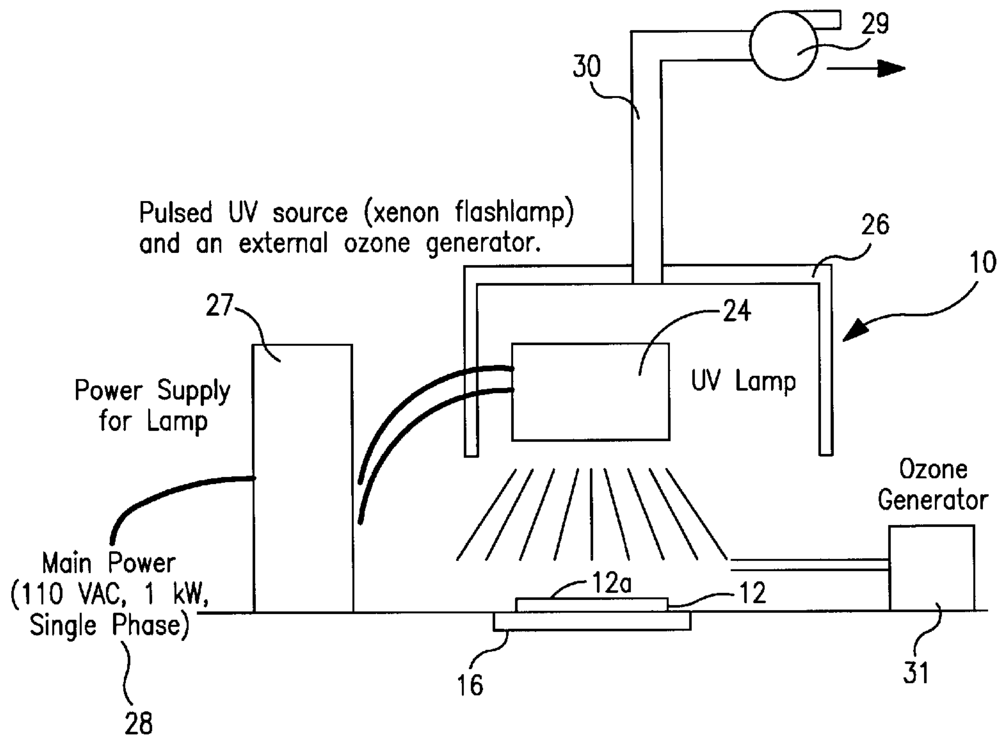
FIG. 1 is a schematic view of a conveyor system 10 for mold or molded part 12.

During the past 15 years there has been an increase of 15–20% in the mass of automobiles. This increased weight resulted in an increase in fuel consumption while maintaining comparable car performance. The reasons for the increased mass include the addition of new features, improved safety and security, improved vibrational/acoustical comfort, and improved reliability. This trend will continue as the automobile industry strives to meet consumers' continuously growing demands. For this reason, it is important to identify the ways of reducing mass by demonstrating the applicability of new, lighter-weight materials from technical, as well as economic viewpoints. Because of these factors all car makers have initiated weight reduction programs with the purposes to reduce fuel consumption and emissions while reducing the fatigue of assembly line workers in the handling of items.

Metals that have been identified as weight reduction replacements for currently used automotive materials are aluminum and magnesium alloys and ultra-high strength steels. Magnesium alloys are increasingly used in the automobile industry because of their exceptional properties, including lightweight (2/3 times that of aluminum), good strength-to-weight ratio, good low-cost machineability and weldability. These alloys are also able to dampen shock waves and have excellent hot forming properties and good dimensional stability. Typical automotive magnesium die castings include cylinder head covers, clutch housings, instrument panels, and wheels.

Though steel is approximately 4 times the density of magnesium and approximately 3 times the density of aluminum, recent efforts in developing ultra-high strength steel (tensile strength >500 MPa) permits part fabrication using thinner gauges which effectively reduce the overall weight. Combining this with a current cost differential of approximately $1.00 per pound between steel and aluminum, and the highest recycling rate, indicates that steel will be maintained as a significant automotive material in the foreseeable future. Evidence of this is provided by the global steel industry's UltraLight Auto Body (ULSAB) project whose aim is to improve the quality of available steel. Recently, the ULSAB project assembled a body-in-white test unit consisting of 90% high- and ultra-high strength steel.

The native oxide layer that forms on aluminum and magnesium alloys is mechanically very weak. In fact unprotected aluminum and magnesium surfaces can become unstable from exposure to the air in a shop environment or corrode in shipment from manufacturer to the end user. Attempts to protect the surface from corrosion include surface application of messier oils or dichromate coatings and the use of desiccant packages to absorb moisture. Before bonding, removal of these corrosion or organic coatings requires a chemical etch and/or primer treatment to ensure adequate joint strength.

In selecting a metal cleaning process, many factors must be considered (Knipe, R., Advanced Materials and Processes 8 23–25 (1997)). The two most important considerations are the nature of the contaminant to be removed and the substrate that is to be cleaned. There are many types of contaminants that can soil the surface of a part. These include pigmented drawing compounds, unpigmented oil and grease, chips and cutting fluids, polishing and buffing compounds, rust and scale, and miscellaneous surface contaminants such as lapping compounds. Aluminum and magnesium alloys are typically cleaned using alkaline solutions with Ph values up to 11 since the resistance to acid attack is weak (Smith, W. F., Structure and Properties of Engineering Alloys, McGraw-Hill, New York, N.Y. (1993)). Similarly, steels are highly resistant to alkalis and attacked by essentially all acidic material. Most of these contaminants are removed using solvent or aqueous method. High impact dry media cleaning can be used to remove rust and scale. In either case the waste product and safety concerns must be addressed.

Other factors that must be considered when choosing a cleaning process are the environmental impact of the process, cost considerations and capital expenses, and surface requirements of subsequent operations such as phosphate conversion coating, painting or plating.

Preferably, the surface of the substrate with the mold release agent is exposed to a UV flashlamp emitting the radiation in the wavelength range (180 nm–500 nm) to reduce heating of the substrate. The exposure is for between about 0.1 to 5 minutes. The mold surface or product surface to be treated is preferably constructed of a metal, although polymer surfaces which are not degraded can be treated.

Process times are regulated by the distance of the UV lamp from the substrate surface, ambient temperature or condition and the extent of surface modification needed. The distance of the UV lamp from the substrate surface determines the intensity of UV radiation at the surface substrate. Ambient conditions are important depending on whether air, nitrogen or ozone are present. Surface modifications are characterized using contact angle measurements which are done using a Rame-Hart goniometer apparatus with deionized water.

The process is preferably used in a continuous process. Either the substrate or the lamps can be moving. FIG. 1 shows a preferred system 10 of the present invention for irradiating a substrate 12 with a mold release agent on it. The substrate 12 is preferably provided on a conveyor belt 16. The belt 16 moves out from the page as shown. Initially the substrate 12 is placed on the conveyor belt 16. The surface 12A is irradiated with UV light from a lamp 24 mounted in a hood 26 which is opaque to the light to prevent eye damage. The lamp 24 is controlled by a pulse modulator 27 and operated by a power supply 28. The hood 26 is provided with a blower 29 which removes volatilized products from the hood 26 through line 30.

Figure 13:
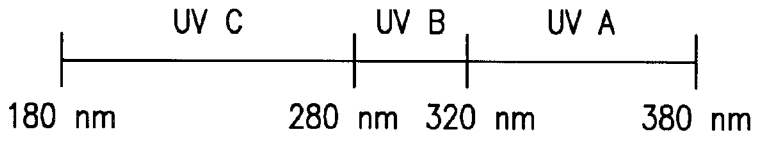
FIG. 13 is a chart showing the effect of ultraviolet radiation on oxygen and ozone.

The dynamic photochemical interactions between UV radiation, ozone and air are complicated, and are not completely understood, but have been extensively studied (Calver, J. G., et al., Photochemistry, John Wiley, New York, N. Y. (1966)). A low-pressure mercury discharge lamp emits UV radiation in the wavelength range of 180 nm to ~400 nm with strong wavelength emissions at 254.5 nm and 185 nm. These two wavelengths correspond to energies of 644 kJ/mol for the 254.5 nm radiation and 458 kg/mol for the 185 nm radiation. Wavelengths in the visible and infrared region are also present. The mechanisms for ozone formation and destruction in the presence of UV light can be illustrated as depicted in FIG. 13. Here atomic oxygen is generated by the photo dissociation of $O_2$ after absorbing 185 nm wavelength radiation. The atomic oxygen then reacts with the diatomic oxygen to form ozone, which can then absorb 253.7 nm radiation and decompose into atomic and diatomic oxygen. Thus one role of the 185 nm light in the cleaning process is to create ozone molecules from diatomic oxygen. At normal atmospheric pressure, the steady-state concentration of $O_3$ is much larger than the concentration of atomic oxygen. Hydroxyl radicals may also form under these conditions by reaction of ozone and/or atomic oxygen with water vapor.

Table 1 shows that the photon energies associated with UV radiation are in the same range as the bond dissociation energies of common covalent bonds in organic molecules.

TABLE 1

Common Bond Energies

| Bond Type | Bond Energy (KJ/mol |
|---|---|
| C—C | 370 |
| C═C | 680 |
| C≡C | 890 |
| C—H | 435 |
| C—N | 305 |
| C—O | 360 |
| C═O | 535 |
| C—F | 450 |
| C—Cl | 340 |
| O—H | 500 |
| O—O | 220 |
| O—Si | 375 |
| N—H | 430 |
| N—O | 250 |
| F—F | 160 |

The role of the 254 nm UV light contributes more to the cleaning process since it interacts more efficiently with a wide variety of organic molecules. Furthermore, organic materials with chromophores such as carbonyl groups and unsaturated centers can absorb even longer wavelengths of UV radiation. Similar to the UV radiation induced reactions of gases, the light induced degradation of organic solids rarely proceeds by a direct photolysis of the covalent bonds, but proceeds through complex reactions involving excitation, energy transfer, and oxidation.

The absorption of a photon by a hydrocarbon molecule creates a short-lived electronically excited state. The excited state might decompose, it might polymerize with other surface organics, or it might oxidize in the presence of oxygen. The 254 nm UV light has been shown to exhibit some cleaning action itself, but the combination of UV light with ozone present greatly enhances the cleaning effectiveness of the process (Vig, J. R., et al., J. Vacuum Sci. Technol., A3 1027–1034 (1985)).

The UV generated atomic oxygen is a free radical and reacts with all organic material to form $Co_2$ and $H_2O$. While the gas phase concentration of atomic oxygen is negligible, most (if not all) of the oxidation processes occur while the organic is attached to the surface. Dissociation of ozone on the surface could lead to chemically significant concentrations of adsorbed atomic oxygen on the surface. Reaction of this oxygen with surface hydrocarbon may be an important mechanistic pathway in the cleaning process. The surface itself might be acting as a catalyst for the cleaning reaction, as it allows adsorbed oxygen and hydrocarbon to come into contact with each other. Exposed metal sites may be necessary to dissociatively adsorb the ozone and generate atomic oxygen. Additionally, the 254 nm light may be enhancing the surface dissociation of $O_3$, in addition to (or instead of) enhancing the reactivity of the hydrocarbon.

As Table 2 shows, the adsorption of energetic UV radiation, in the wavelength range of 180 to 500 nm by organic contaminants on metal surfaces results in chemical bond breaking of surface molecules (Carey, F. A., et al., Advanced Organic Chemistry: Part A Structure and Mechanisms, Plenum Press, New York, N.Y. (1997)).

TABLE 2

| UV Absorption of Various Organic Materials | |
|---|---|
| Type of Organic | Absorption Maxima (nm) |
| Simple Alkanes | 190–200 |
| Alicyclic Dienes | 220–250 |
| Cyclic Dienes | 250–270 |
| Styrenes | 270–300 |
| Saturated Ketones | 270–280 |
| α,β-Unsaturated Ketones | 310–330 |
| Aromatic Ketones and Aldehydes | 280–300 |
| Aromatic Compounds | 250–280 |

The UV/ozone cleaning process, using a pulsed or continuous light source and an oxidizing gas, dissociates chemical bonds of the surface contamination film and particles without affecting the base material. This suggests that the UV/ozone technique has the potential for removing metallic ions, organic films and oxides. Though the irradiation system operates at room temperature and ambient pressure, the infrared wavelength portion of the radiation combined with focusing optics of the lamp can cause large, local, increases in surface temperature which may cause ejection of particles with sizes less than 1 μm. The high thermal conductivity and large thermal mass protects the part from localized melting or microroughening.

The strength of a bonded joint (welded or liquid adhesive) is determined by the physical, mechanical, and chemical properties of the adhesive-metal surface (Kinloch, A. J., Adhesion and Adhesives: Science and Technology, Chapman and Hall, New York, N.Y. (1987)). The first step in the formation of an adhesive bond is the establishment of interfacial molecular contact by wetting. A convenient way to quantify the degree of wetting is to measure the contact angle of a deionized water droplet placed on the material surface. Since the work of adhesion is proportional to the cosine of the contact angle, the adhesive bond strength increases as the contact angle decreases.

In the following Examples 1 to 12, a continuous ultraviolet lamp from Fusion (Model FS 600) was used. It had a power input of 6 kW. The other variables that play a role in the extent of modification of the substrate surfaces by UV are: distance of lamp from the substrate surface (d), exposure time (t), effect of humidity surrounding the substrate, intensity of lamp radiation, presence of UV stabilizers in the substrate, the nature of the substrate surface and cooling of the surface.

An external ozone generator 31 (Ozotech, Eureka, Calif. 96097) was used to increase the concentration of ozone over the substrate 12 surface over what is generated in air by the UV light. The ozone flow rate used during experimentation was 30 std.cu.ft./hr. The other variables were the time of exposure, the distance between the sample and the UV source.

The experiments show that the treatment enhances the substrate's surface wettability, with the degree of enhancement depending on the substrate characteristics and the treatment processing conditions used. The substrates are characterized prior to and after UV treatment using contact angle measurements to determine wettability. X-ray photoelectron spectroscopy (XPS) and Fourier transform infrared spectroscopy with the attenuated total reflectance (FTIR-ATR) setup is used to characterize the surface chemical composition of the substrates. Atomic force microscopy (AFM) is used to characterize and compare the control substrate surfaces with the UV treated surfaces. Also, environmental scanning electron microscopy (ESEM) is used to determine the effect initial substrate morphology has on UV treatment. Adhesion measurements have been conducted using a pneumatic adhesion tensile testing instrument.

On exposure to various treatments the substrates were characterized for wettability, surface chemical composition, morphology and stability. Wettability was determined by measuring contact angles of de-ionized water using the Rame-Hart goniometer apparatus. Except where specified, the contact angles (θ) were measured immediately after UV exposure. At least ten measurements of contact angles were taken for each sample and the averages are reported here.

Figure 2:
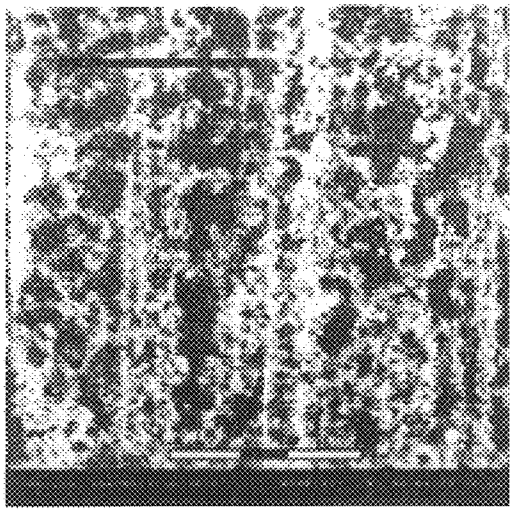
FIGS. 2 and 2A are an electron microscope image of a surface of aluminum 6061 surface with a mold release agent (FIG. 2A) and after UV treatment, respectively.
Figure 2A:
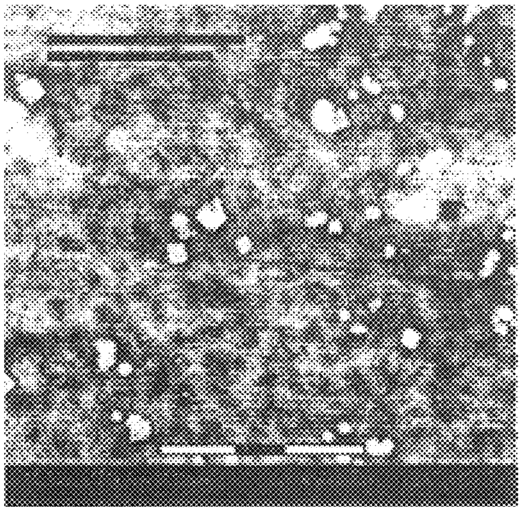

Environmental scanning electron microscopy (ESEM) was also used to characterize surface morphology prior to and after UV treatment (FIGS. 2 and 2A). Also, ESEM was used to determine if there was any relationship between extent of modification and initial morphology of the substrate. The ESEM used for the morphological study was an Electroscan 2020.

In the following Examples the mold release agents were to be removed. Mold release agents (lubricants) are frequently present on surfaces in manufacturing environments. Removing mold release from surfaces is a time-consuming process. Inadequate removal causes loss in paint performance.

The metal mold release agents used in the following Examples are shown in Tables 3 and 4.

TABLE 3

| Metals | Mold Release Agents (Chem Trend) |
|---|---|
| AL3003 - 0.025" thickness | RCTW-9011 |
| AL2024 - 0.063" thickness | MR-515 |
| Steel - 0.032" thickness | Safety-Lube |
| | Mono-coat 370W |

TABLE 4

| RCTW-9011 ™ | Safety-Lube ™ |
|---|---|
| 85–95% water | 15–25% lubricant blend |
| <5% release blend/emulsifiers | 1–3% alkanolamine |
| trace preservative | balance water |
| 1–10% organosiloxane | |
| **MR-515 ™** | **Mono-coat 370W ™** |
| 90–95% Heptane | <5% release blend |
| 5–10% release blend | <2% ethyl alcohol |
| | balance water |

In the following experiments UV cleaning of metal surfaces was compared to detergent (Alconox, Microclean,) washing. Mold release agents were applied to bare metal panels. Contaminated metal panels were UV treated in the high power, continuous Fusion UV lamp. Cleaning of mold release from the surface was characterized by changes in wettability (contact angle measurements.)

EXAMPLE 1

Figure 3:
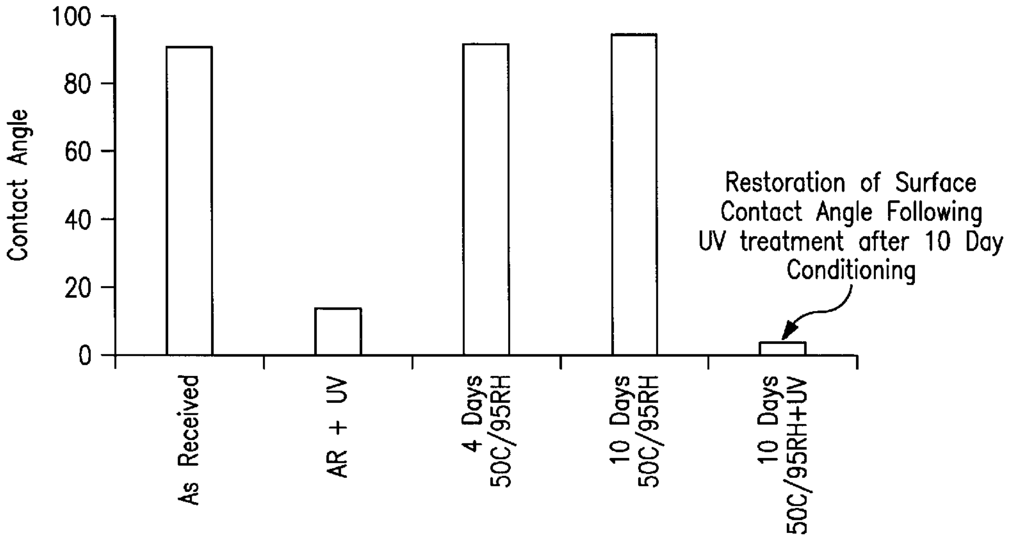
FIG. 3 is a graph showing the contact angle of water on a surface of an Aluminum 356 quarter panel with a mold release agent (RTCW-9011; ChemTrend), where AR is "as received" and "UV" is ultraviolet. The graph shows the effects of storage at various times at 50° C. and 95% RH (Room Humidity) and the re-exposure to the UV. The UV treatments were with a continuous ultraviolet lamp for three (3) minutes exposure.
Figure 4:
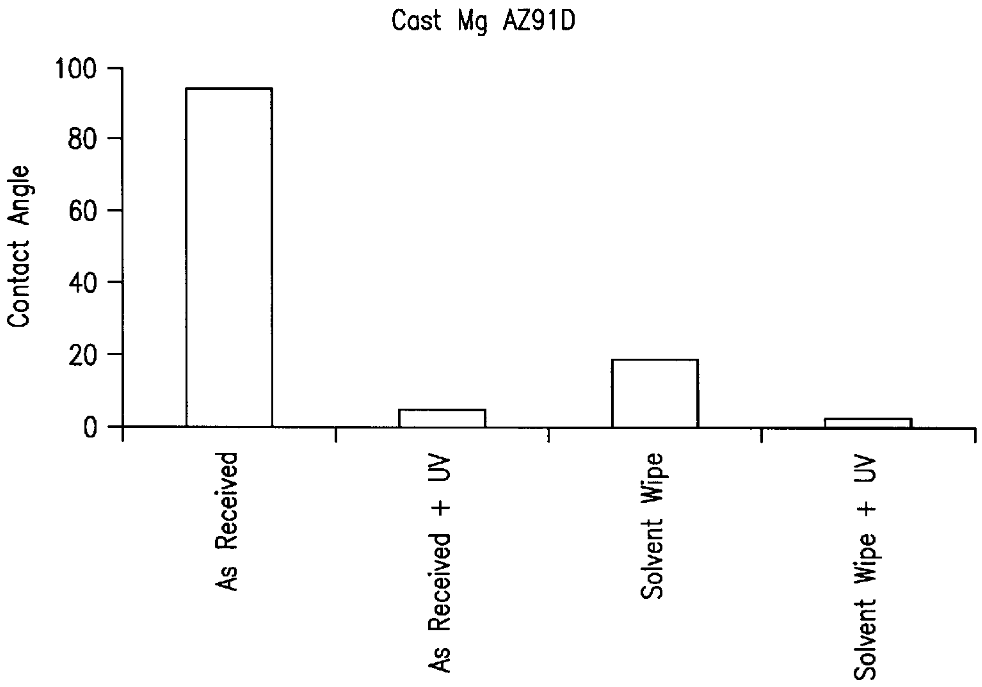
FIG. 4 is a graph showing the contact angle after UV treatment of Cast Mg AZ91D with a mold release agent on it (RTCW-9011; ChemTrend) for three (3) minutes with a continuous ultraviolet lamp. The solvent was acetone.
Figure 5:
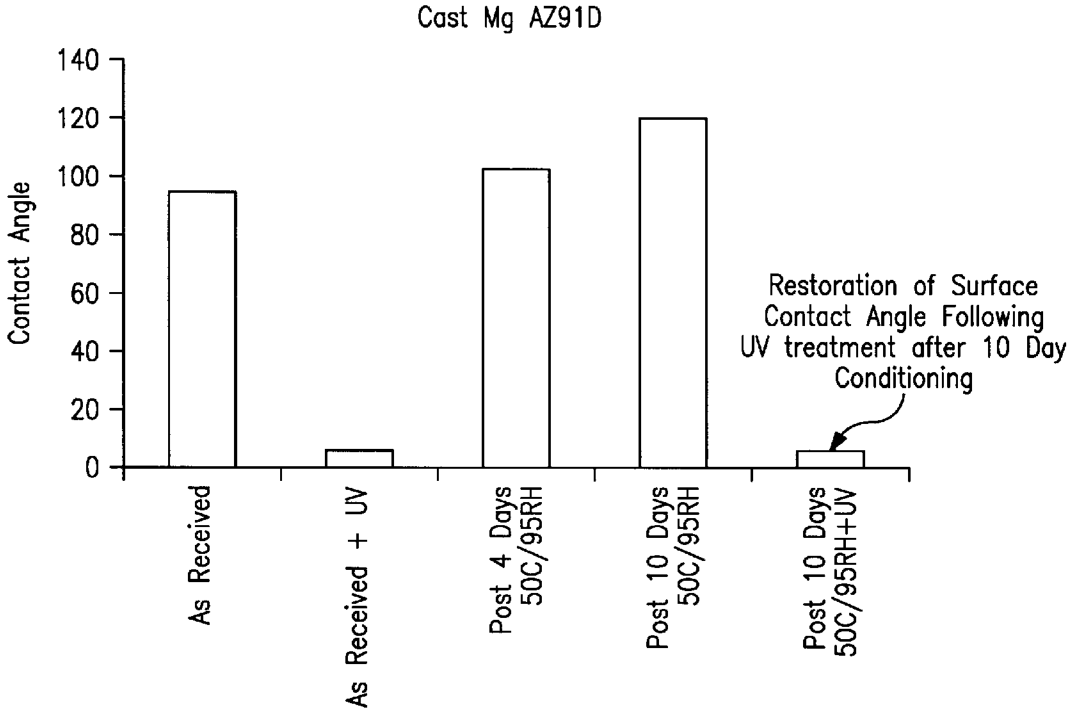
FIG. 5 is a graph showing the contact angle results for the UV treatment of Cast Mg AZ91D with a mold release agent (RTCW-9011; ChemTrend) on it for three (3) minutes with a continuous lamp. After 10 days the surface was retreated to re-establish the low contact angle.
Figure 6:
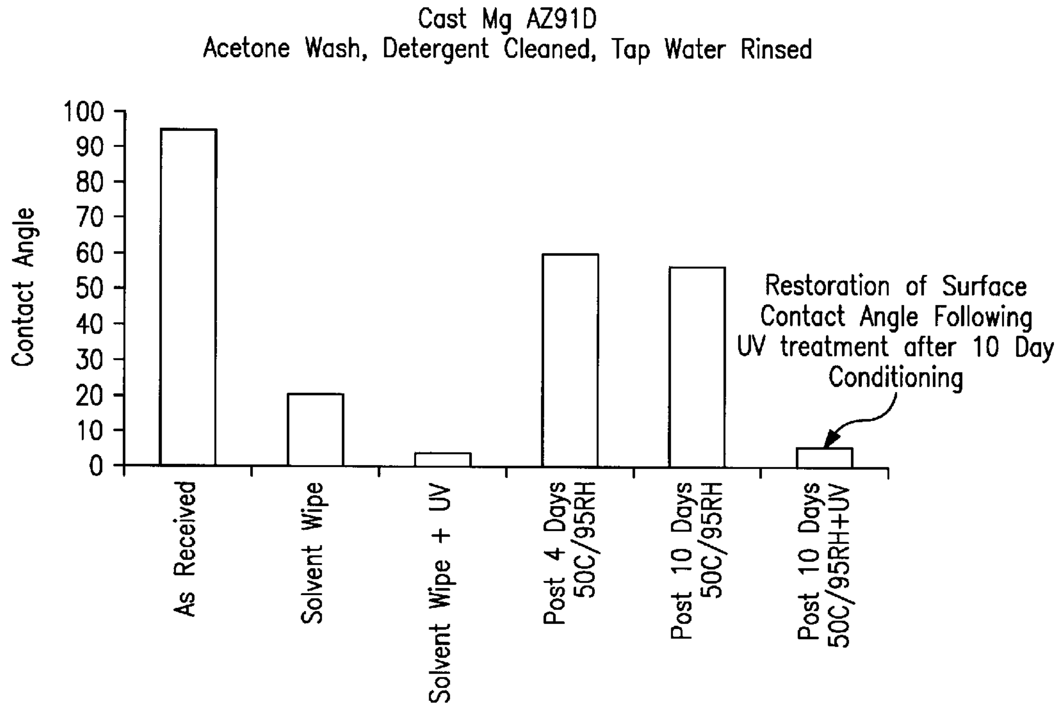
FIG. 6 is a graph showing the contact angle after UV treatment of Mg AZ91D with a mold release agent on it (RTCW-9011; ChemTrend) which has been acetone washed, detergent cleaned and tap water removed and then treated in the manner of FIG. 5.

FIG. 3 shows the results of UV treatment of 356 cast aluminum quarter panels (0.025" thick) to remove the mold release agent (RTCW-9011; ChemTrend). The exposure was for three (3) minutes with a continuous lamp. The contact angle of water in the panel was reduced to about 12°. The panels when treated again after ten (10) days had a contact angle of less than 5°. The 10 day exposure was to water vapor at 50° C. and 95% relative humidity (RH).

EXAMPLE 2

FIGS. 3 to 6 show the results to Example 1 with Mg AZ91 D with mold release agent (RTCW-9011; ChemTrend). Equivalent results to Example 1 were achieved with magnesium. The use of a solvent wipe increased the results of FIG. 4 only slightly.

EXAMPLE 3

Figure 7:
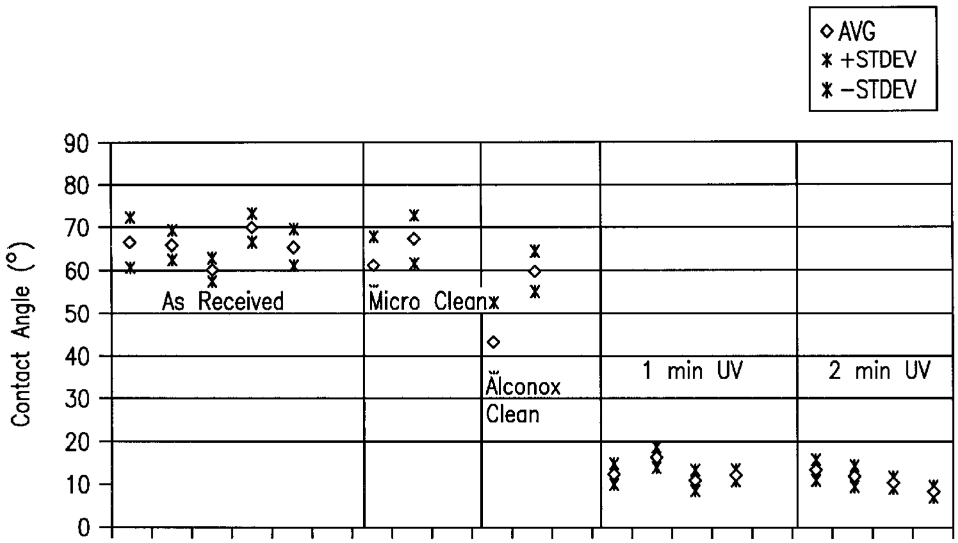
FIG. 7 is a graph showing the contact angle after detergent washing and UV cleaning Aluminum 2024 with no mold release agent on it.
Figure 7A:
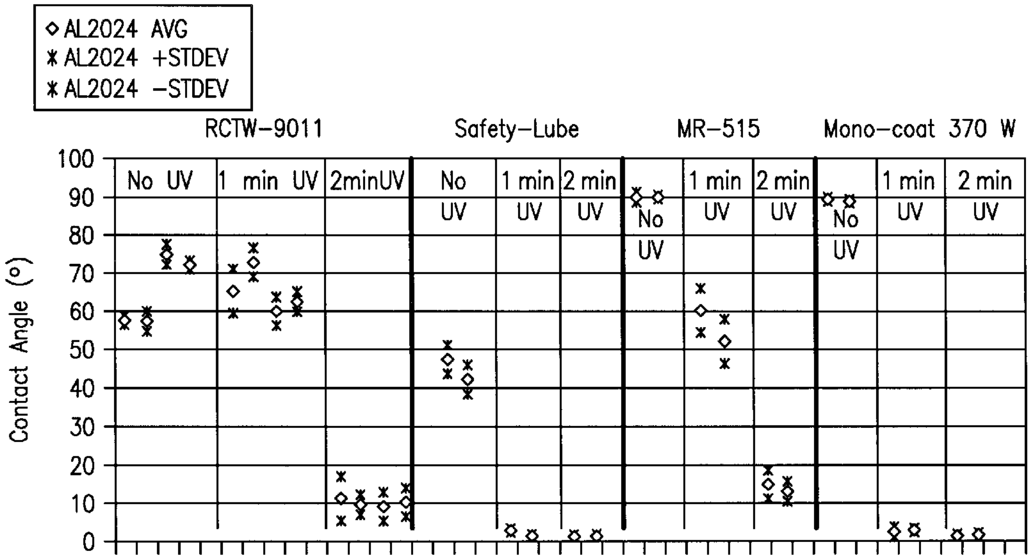
FIG. 7A shows the results with various mold release agents on the aluminum surfaces as a function of time.

FIGS. 7 and 7A show the results with aluminum 2024 0.063" thick) with mold release agents Safety Lube™ MR515™ or Mono-Coat 370W™ (Chem Trend) (FIG. 7A) and without the mold release agents (bare metal FIG. 7). The results were better with the mold release agents.

EXAMPLE 4

Figure 8:
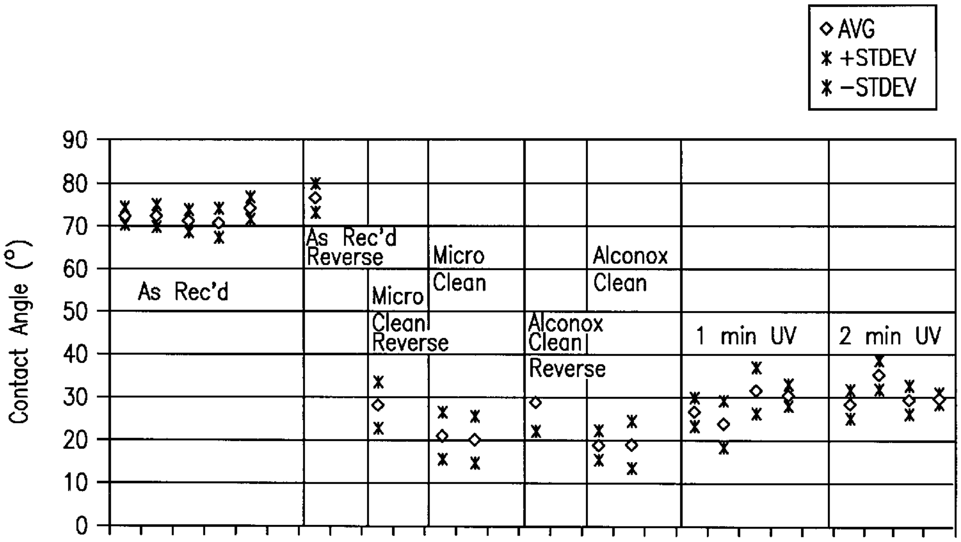
FIG. 8 is a graph showing the contact angle after UV cleaning of steel RCTW-9011 surfaces with no mold release agent.
Figure 8A:
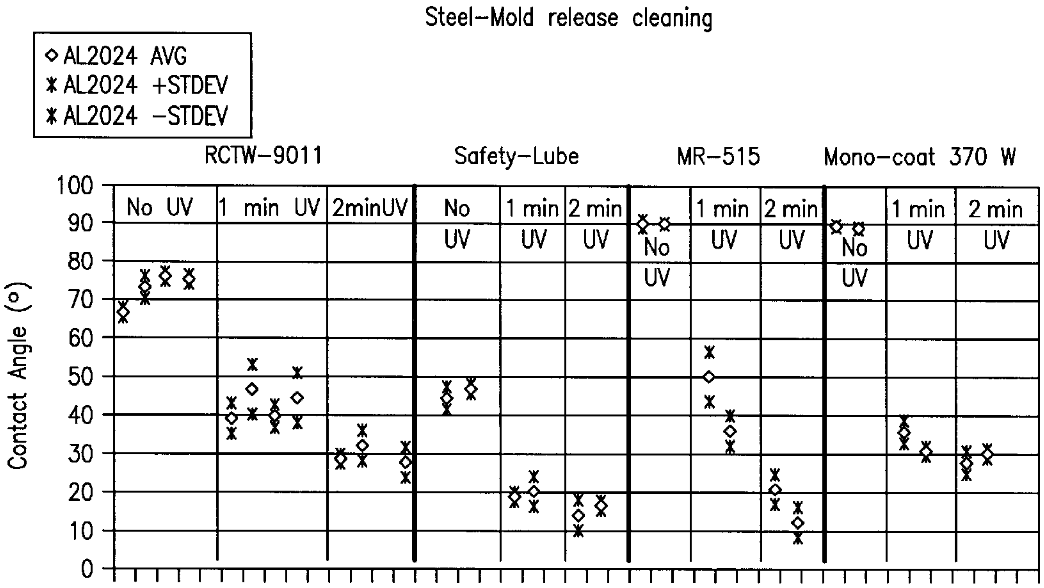
FIG. 8A shows the results of UV treatment of the surfaces with various mold commercial release agents.
Figure 9:
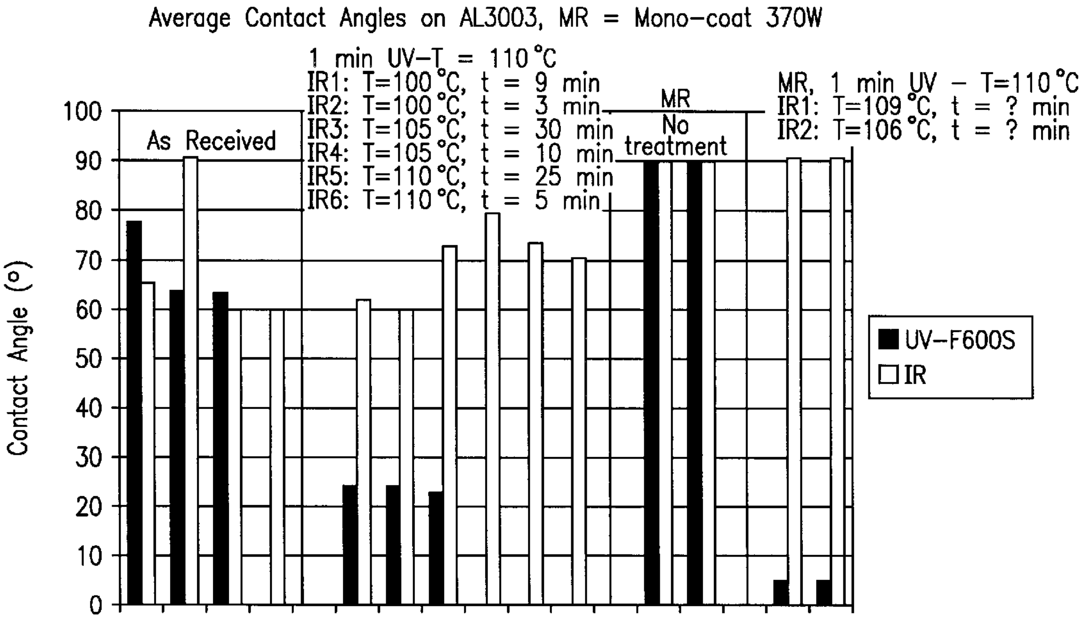
FIG. 9 is a graph showing the contact angle after UV treatment and for infrared (IR) treatment on bare and mold release agent (Mono-coat 370W) treated Al 3003 Q-panels (Quarter Panels).
Figure 10:
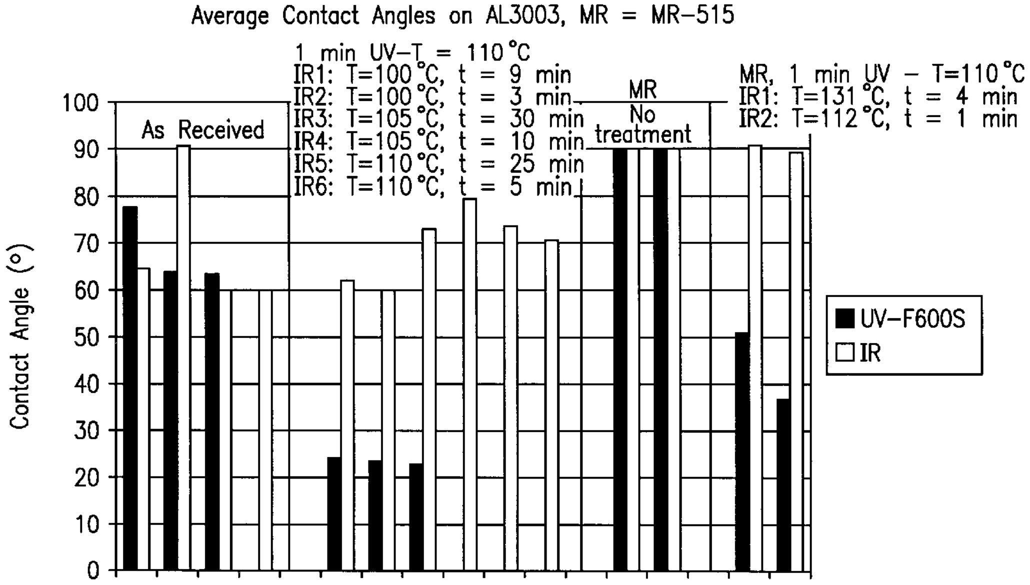
FIG. 10 is a graph showing a comparison of IR and UV treatment on bare and MR-515® coated 370W treated A13003 Q-panels.
Figure 11:
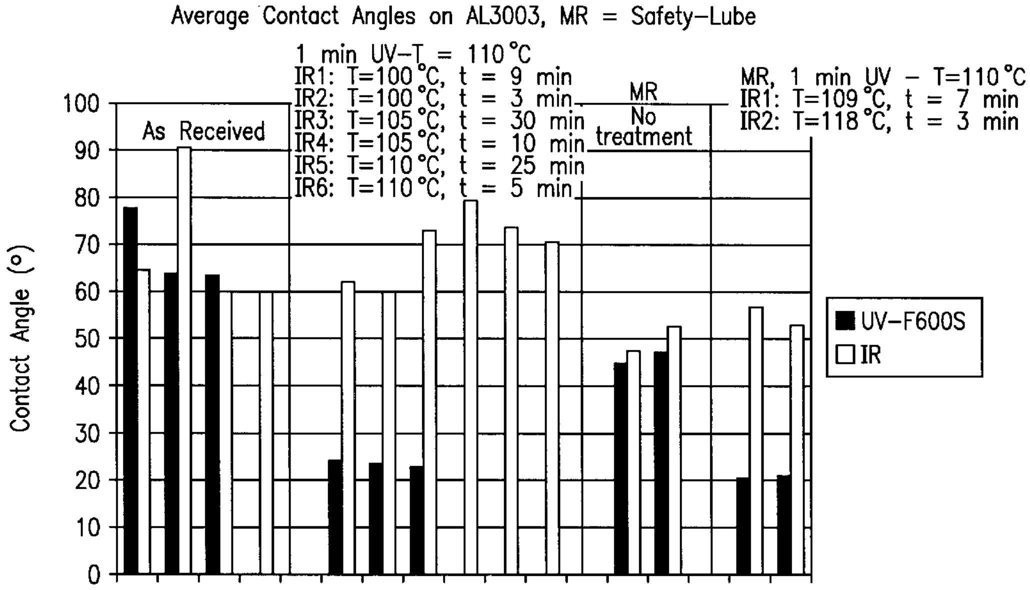
FIG. 11 is a graph showing a comparison of IR and UV treatment on bare and RCT-9011™ coated 370W treated A13003 Quarter panels.
Figure 12:
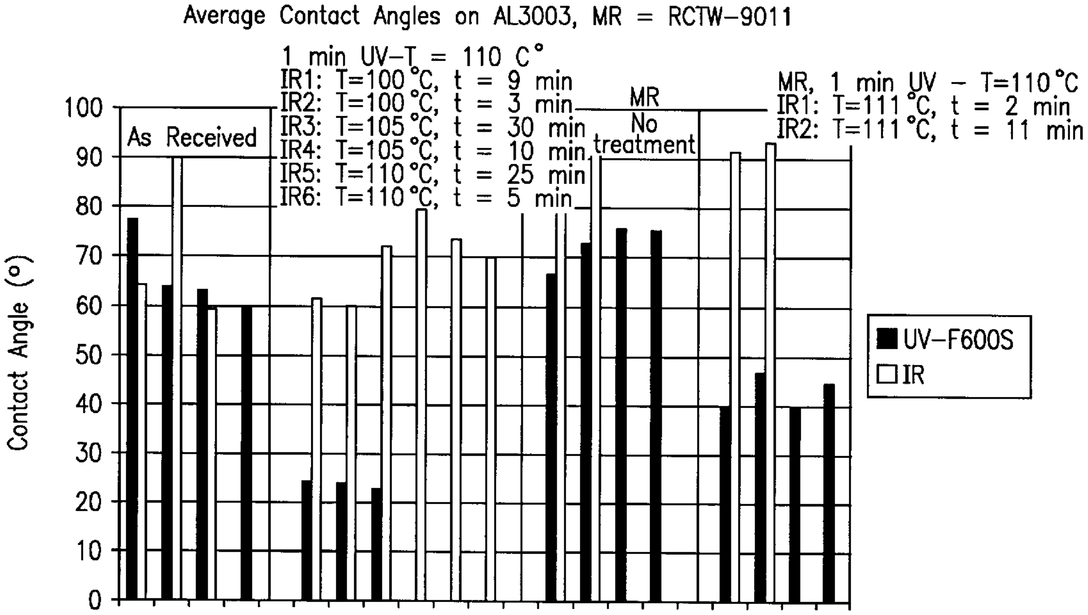
FIG. 12 is a graph showing a comparison of IR and UV Bare and RCTW-9011™ coated 370W™ treated AL3003 Q-panels.

FIGS. 8 and 8A show the results with steel (0.032" thick) coated with Safety Lube™, Monocoat 370W™ or MR-515™ mold release agents (Chem Trend; FIG. 8A) and without the mold release agents (FIG. 8). The results are at least equivalent.

EXAMPLES 5, 6 and 7

FIGS. 9 to 12 show the results with Monocoat 370W™, MR515™ and SAFETY LUBE™ mold release agents comparing thermal heating alone (IR) to continuous UV on Al3003 quarter panels. There was no significant improvement with IR.

The conclusions in regard to cleaning of Al, Mg and steel alloys was that UV treatment is capable of decreasing contact angles with water; and treatment times can be greatly reduced by using continuous high intensity continuous UV sources. The continuous source should have a power input between about 0.1 and 20 KW.

UV treatment is capable of decreasing contact angles of water on Aluminum and commonly used metals (~85° to 10–15°). Treatment times can be greatly reduced by using high intensity UV sources and/or supplemental ozone (~10–120 seconds). For cleaning of bare metals, UV treatment is more effective than detergent washing (contact angle of about 15° to 30°). Wettability of mold release agent coated metal surfaces can be increased/restored to levels similar to bare UV treated metal surfaces.

It is intended that the foregoing description be only illustrative of the present invention and that the present invention be limited only by the hereinafter appended claims.

We claim:

1. A method for removing a mold release agent from a surface which comprises:

exposing the entire surface coated with the mold release agent to continuous ultraviolet light having a wavelength between 180 and 500 nm without higher wavelengths and strong emissions at 254.5 and 185 nm to thereby chemically bond break and volatilize the mold release agent for removal without damaging the surface wherein said continuous ultraviolet light is exposed for between about 0.1 to 5 minutes.

2. The method of claim 1 wherein the mold release agent is a mold lubricant.

3. The method of claim 1 wherein the surface is in a mold for producing an article.

4. The method of claim 3 wherein the mold is made of a metal.

5. The method of claim 3 wherein the mold is a material selected from the group consisting of a polymer, ceramic and polymer composite.

6. The method of any one of claims 1, 2 or 3 wherein the surface is exposed to a chemical that chemically reacts with the mold release agent during the exposing.

7. The method of any one of claims 1, 2, or 3 wherein the surface is exposed to ozone during the exposing which reacts with the mold release agent.

8. The method of claim 1 wherein the light source is a low pressure mercury vapor lamp.

9. The method of claim 1 wherein the continuous ultraviolet light is produced by a xenon flashlamp energized by pulses of current or from a continuous UV emission lamp energized by microwave energy.

10. The method of claim 1 wherein the surface comprises a polymer or ceramic.

11. The method of claim 1 wherein the molding surface comprises a composite material.

12. The method of claim 1 wherein the molding surface comprises a metallic material.

13. The method of claim 1 wherein the exposing is under a hood which vents products of the mold release agent which are volatilized by the continuous ultraviolet light.

14. The method of claim 1 wherein after the step of exposing the surface to the continuous ultraviolet light, contacting the surface with a flowing gas to remove any residues from the exposure.

* * * * *